(12) United States Patent
Meier et al.

(10) Patent No.: US 6,799,950 B2
(45) Date of Patent: Oct. 5, 2004

(54) METHOD AND APPARATUS FOR CONTROLLING A COMPRESSOR

(75) Inventors: Jörg Meier, Oldendorf (DE); Carsten Petry, Elze (DE)

(73) Assignee: WABCO GmbH & Co. oHG, Hannover (DE)

( * ) Notice: Subject to any disclaimer, the term of this patent is extended or adjusted under 35 U.S.C. 154(b) by 0 days.

(21) Appl. No.: 10/123,048

(22) Filed: Apr. 15, 2002

(65) Prior Publication Data
US 2002/0187048 A1 Dec. 12, 2002

(30) Foreign Application Priority Data
Apr. 24, 2001 (DE) .......................................... 101 20 206

(51) Int. Cl.[7] .............................................. F04B 49/10
(52) U.S. Cl. ........................ 417/12; 417/32; 417/44.2; 417/53
(58) Field of Search .......................... 417/32, 12, 44.2, 417/53

(56) References Cited

U.S. PATENT DOCUMENTS

| | | | | |
|---|---|---|---|---|
| 4,311,497 A | * | 1/1982 | Newell | ........................ 62/158 |
| 4,371,315 A | * | 2/1983 | Shikasho | ........................ 417/5 |
| 5,054,995 A | | 10/1991 | Haseley et al. | |
| 5,343,708 A | * | 9/1994 | Gaudet et al. | ................ 62/55.5 |
| 5,901,560 A | * | 5/1999 | Heile et al. | .................... 62/115 |
| 5,941,689 A | * | 8/1999 | Skirde | .......................... 417/32 |
| 6,079,950 A | * | 6/2000 | Seneff | .......................... 417/12 |
| 6,212,451 B1 | * | 4/2001 | Kutscher et al. | .............. 701/37 |
| 6,219,601 B1 | | 4/2001 | Shono et al. | |
| 6,374,193 B1 | * | 4/2002 | Kutscher et al. | ............ 702/138 |
| 6,406,266 B1 | * | 6/2002 | Hugenroth et al. | ........ 417/44.1 |
| 6,572,338 B2 | * | 6/2003 | Janisse et al. | ................ 417/12 |

FOREIGN PATENT DOCUMENTS

| | | |
|---|---|---|
| DE | 39 19 407 A1 | 1/1990 |
| DE | 43 33 591 A1 | 4/1995 |
| DE | 196 21 946 C1 | 9/1997 |
| DE | 198 12 234 A1 | 9/1999 |

* cited by examiner

*Primary Examiner*—Charles G. Freay
(74) *Attorney, Agent, or Firm*—Kramer Levin Naftalis & Frankel LLP

(57) ABSTRACT

A method and apparatus for controlling a compressor suitable for delivery of pressurized fluid to a pressurized fluid system, wherein the delivery of the pressurized fluid to the pressurized fluid system can be cycled on and off as a function of a temperature signal received from a temperature sensor. The delivery of pressurized fluid is turned off when the temperature signal exceeds a temperature limit value that is based on the backpressure caused by the pressurized fluid system. Time criteria can be superposed on the temperature limits for controlling the activation and deactivation of the compressor. A preferred area of application of the invention is in vehicle pneumatic suspension systems, including systems having multiple modes of operation.

36 Claims, 2 Drawing Sheets

METHOD AND APPARATUS FOR CONTROLLING A COMPRESSOR

BACKGROUND OF THE INVENTION

The present invention is directed generally to a method and apparatus for controlling a compressor of the type used in the delivery of pressurized fluid into a pressurized fluid system such as, for example, a vehicle pneumatic suspension system, whereby the delivery of the pressurized fluid into the pressurized fluid system can be cycled on and off to protect the compressor against overload and damage caused by overheating.

Damage to the compressor due to overheating can occur, for example, at the pressure valve as a result of the material becoming brittle, which can lead to leaks. Furthermore, the piston ring can sustain damage, which can lead to destruction of the piston ring and, as a result, seizing of the piston.

DE 196 21 946 C1, which is incorporated herein by reference, discloses a control arrangement for a compressor of the general type under consideration in which an estimated value is determined for the operating temperature of the compressor on the basis of empirical values. If a predesignated temperature threshold is exceeded, the compressor can be turned off automatically.

Furthermore, DE 198 12 234 A1, which is incorporated herein by reference, generally discloses that the heat-transfer conditions in the surroundings of the compressor can be estimated, by means of an appropriate model analysis, for example, and that the compressor can then be controlled as a function of the estimated data.

In such prior art arrangements, the actual temperature conditions at the compressor are not determined; rather, they are merely approximated (only estimated values are used). The result of the uncertainty associated with such estimates is inefficient utilization of the compressor if damage is to be safely avoided. Furthermore, such prior art arrangements necessitate sizing the compressor as a relatively large unit, resulting in greater space requirements and higher costs.

DE 198 10 764 A1 generally discloses switching the compressor from continuous operation to a pulsed mode of operation when a certain temperature limit value is reached. That is, the compressor is cycled on and off rapidly. This results in rapid wear of the compressor. This also results in increased current consumption by the electric motor used to drive the compressor primarily because the starting current of the electric motor is considerably higher than the continuous current.

It is desired to provide an improved method and apparatus for controlling a compressor to protect the compressor against overload and damage caused by overheating which avoids frequent on and off cycles while achieving efficient utilization of the compressor.

SUMMARY OF THE INVENTION

Generally speaking, in accordance with the present invention, a method and apparatus for controlling a compressor are provided which overcome disadvantages associated with prior art methods and systems.

According to a preferred embodiment of the present invention, to protect the compressor against overload and damage caused by overheating the compressor is cycled off when the temperature measured at the compressor exceeds a maximum temperature selected based on backpressure caused by the pressurized fluid system. The compressor is then cycled on when it has cooled to a preselected restart temperature.

In an alternative embodiment of the invention, time criteria are superposed on the temperature limits for controlling the activation and deactivation of the compressor.

A temperature sensor can be used to measure the temperature at the compressor. This has the advantage of permitting further improved utilization of the compressor, since the temperature at an appropriate place of the compressor can be determined exactly via a temperature sensor, and temperature estimation, into which relatively large tolerances would have to be built for safety reasons, is avoided. Alternatively, the compressor temperature can be determined by computation based on thermal modeling.

In another embodiment of the invention, both the temperature sensor and thermal modeling are utilized, the signal of the temperature sensor being primarily relied on and thermal modeling being used as backup for determination of the temperature value in the event of defect or malfunction of the temperature sensor. This arrangement provides distinct benefits with regard to operating safety.

In an embodiment of the present invention directed to pressurized fluid systems having discrete modes of operation, discrete temperature limit values can be defined as a function of the modes of operation for controlling the compressor during such modes of operation.

The method and apparatus according to the present invention can be used for any type of compressor control, such as for regulation by means of a pressure regulator or a governor, for compressors that can be decoupled via a mechanical coupling from a drive, such as an internal combustion engine, or even for compressors that can be driven via an electric motor. With an electric motor, the present invention safeguards parts that are susceptible to damage, such as brush rockers and motor windings, against damage caused by overheating.

Accordingly, it is an object of the present invention to provide a method and apparatus for controlling a compressor in a pressurized fluid system to protect the compressor against overload and damage caused by overheating that takes into consideration backpressure caused by the pressurized fluid system.

It is another object of the present invention to provide a method and apparatus for controlling a compressor that takes into consideration actual temperature conditions at the compressor to avoid the large tolerances associated with approximating such temperature conditions that would need to be provided for safety reasons.

It is also an object of the present invention to provide a method and apparatus for controlling a compressor that permit simple and understandable control of the compressor and efficient utilization of the compressor.

It is a further object of the present invention to provide a method and apparatus for controlling a compressor that avoids frequent on and off cycles and the associated damage.

It is still another object of the present invention to provide a method and apparatus for controlling a compressor that permits the compressor to be dimensioned as a compact unit.

It is yet another object of the present invention to provide a method and apparatus for controlling a compressor in pneumatic systems having various modes of operation.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description, taken in connection with the accompanying drawings, in which.

DETAILED DESCRIPTION OF THE PREFERRED EMBODIMENTS

Figure 1:
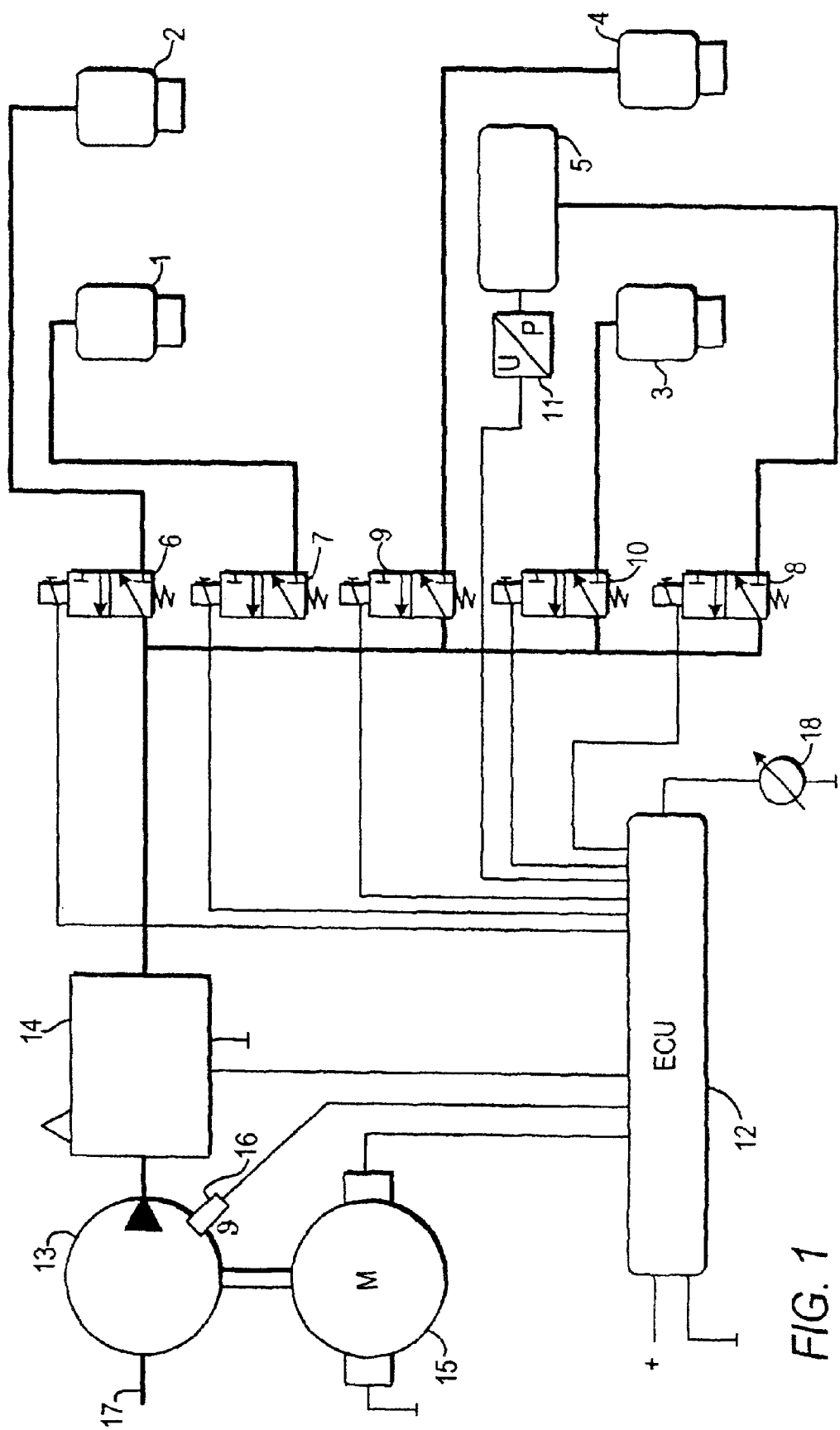
FIG. 1 is a schematic diagram of a pneumatic vehicle suspension system including a controller arranged and constructed in accordance with one embodiment of the present invention.

Referring now to the drawing figures where like reference numbers are used for corresponding elements, FIG. 1 shows a pneumatic suspension system of a vehicle having four pneumatic suspension springs 1, 2, 3, 4, one for each wheel of a four-wheel vehicle. Pneumatic suspension springs 1, 2, 3, 4 are in communication via pneumatic lines with 2/2-way valves 6, 7, 9, 10. Furthermore, an air pressure reservoir 5 is provided which is in communication via a pneumatic line with another 2/2-way valve 8. A pressure sensor 11 for sensing the pressure in reservoir 5 is in communication with reservoir 5.

On the pressurized fluid side, valves 6, 7, 8, 9, 10 are connected via pneumatic lines to a common air dryer 14. Air dryer 14 can be of conventional design having a regeneration function in which the compressed air from pneumatic suspension springs 1, 2, 3, 4 or from reservoir 5 flows back via valves 6, 7, 8, 9, 10 into air dryer 14 and can be released via a regeneration path into the atmosphere to remove moisture.

Air dryer 14 is in communication with a compressor 13, such as, for example, a conventional piston compressor. Compressor 13, which can be driven via a shaft by an electric motor 15, takes in air from the atmosphere via an intake port 17. By turning on electric motor 15, compressed air can be generated and delivered to the pneumatic suspension system or pressurized fluid system formed by springs 1, 2, 3, 4, reservoir 5, valves 6, 7, 8, 9, 10 and air dryer 14.

Valves 6, 7, 8, 9, 10 are preferably electromagnetically actuatable valves, and by their electrical leads are connected on one side to electrical ground and on the other side to an electronic controller 12 for controlling the functions described in greater detail hereinafter. Furthermore, for activating the regeneration function, air dryer 14 is electrically connected to controller 12. Electric motor 15 is also electrically connected, for activation, to controller 12.

Additionally, pressure sensor 11 as well as a temperature sensor 16 and an operator control 18 are electrically connected to controller 12. Temperature sensor 16 is preferably disposed at a suitable temperature-sensitive location on compressor 13.

Operator control 18 can be operated by, for example, the driver of the vehicle equipped with the pneumatic suspension system, to adjust (raise or lower) the level of the vehicle, e.g., at an upper, a middle or a lower level. The vehicle level or the respective level position at the individual strut units of the vehicle can be measured by suitable conventional displacement sensors (not shown) which are also connected to controller 12.

Controller 12 processes input signals from pressure sensor 11, temperature sensor 16, operator control 18 and the displacement sensors, and generates therefrom activation signals for electric motor 15, air dryer 14 and valves 6, 7, 8, 9, 10.

In operation of the pneumatic suspension system depicted in FIG. 1, when controller 12 detects, at one or more strut units, a deviation between the level position measured by the respective displacement sensor and a specified level position, which is set by means of operator control 18, it activates the solenoid valve 6, 7, 9, 10 allocated to the strut unit, whereby the valve is switched from its shutoff position to an admission position. If the vehicle level position is to be raised, and thus the air mass in the pneumatic suspension springs is to be increased, electronic controller 12 additionally activates solenoid valve 8 to permit pressurized fluid from reservoir 5 to flow into the respective pneumatic suspension springs 1, 2, 3, 4. Depending on the desired pressure in the pneumatic suspension springs 1, 2, 3, 4 and the existing pressure in reservoir 5, controller 12 can turn on electric motor 15 if necessary, whereby compressor 13 begins to run and a higher pressure level can be generated than is present in reservoir 5.

It should be appreciated that frequent changes of vehicle level in response, for example, to frequent actuation of operator control 18 can deplete the compressed air supply in reservoir 5. Compressor 13 is available to restore the depleted supply of compressed air. Desirably reservoir 5 is sized to hold sufficient compressed air for one to two complete cycles of raising and lowering of the vehicle.

If a reduction of the air mass in a pneumatic suspension spring is desired, valve 8 remains closed and compressor 13 remains turned off. Furthermore, air dryer 14 can be switched to regeneration mode whereby compressed air from the pneumatic suspension springs to be vented can flow into the atmosphere. In this process, undesired moisture is also discharged.

As indicated above, reservoir 5 functions to permit a rapid increase of the air mass in the pneumatic suspension springs and thus rapid raising of the vehicle level position. Because compressor 13 has a relatively small delivery flow, it is able to increase the air mass in the pneumatic suspension springs only slowly. It is therefore desirable to maintain reservoir 5 at an appropriate constant pressure level or, in the event of a pressure drop, to restore the appropriate pressure level as quickly as possible. However, it is preferred that compressor 13 not be overloaded for this purpose and that the compressor is available for a required level increase. This is achieved advantageously in accordance with the method and apparatus of the present invention.

In the pneumatic suspension system described herein, a distinction can be made between two modes of operation, namely the mode of operation for filling reservoir 5 and the mode of operation for direct delivery of compressed air from compressor 13 into pneumatic suspension springs 1, 2, 3, 4. In the mode of operation for filling reservoir 5, compressor 13 generates a high pressure level to ensure that an adequate pressure difference is available for subsequent transfer of pressure reserve from reservoir 5 into pneumatic suspension springs 1, 2, 3, 4 in a reasonably short period of time. Since this mode of operation is not directly perceived by the user of the pneumatic suspension system, but runs in the background, as it were, it is herein referred to as a "background mode of operation."

In the other mode of operation (i.e., for delivery of compressed air into pneumatic suspension springs 1, 2, 3, 4), a lower pressure is involved, and so the backpressure of the pressurized fluid system, against which compressor 13 works, is also lower. This mode of operation is herein referred to as the "primary mode of operation."

Therefore, what preferably takes place is a background mode of operation with high backpressure and a primary mode of operation with low backpressure. It has been found that the critical temperature, or the temperature limit for turning off the compressor in order to prevent damage to the compressor, is influenced by such backpressure. Thus, the permissible temperature limit value for low backpressure is higher than that for high backpressure. The reason for this can be found in the different heating behavior of other components, such as the pressure valve disposed in the compressor for pressure limitation, or the brush rockers of the electric motor.

Accordingly, it is a desirable feature of the present invention to define the temperature limit value based on backpressure. One way this can be achieved is by using a pressure sensor to measure the backpressure.

In one embodiment of the present invention, use of a pressure sensor can be avoided by distinguishing between discrete modes of operation and allocating appropriate temperature limit values $T_2$, $T_4$ to these modes of operation. Since, in the modes of operation, the respective backpressures of the pressurized fluid system are known or can be readily determined, temperature limit values $T_2$, $T_4$ can also be readily determined through testing.

Hereinafter, the discrete modes of operation are preferably considered to be the primary mode of operation and the background mode of operation.

In one embodiment of the present invention, the value selected for temperature limit value $T_2$ of the background mode of operation is intentionally lower than is necessary to prevent damage to compressor 13 or electric motor 15. Preferably, compressor 13 and electric motor 15 are maintained at a lower temperature during filling of reservoir 5, so a certain running time is available to those elements for the primary mode of operation of filling pneumatic suspension springs 1, 2, 3, 4 immediately and without a cooling pause. This has the advantage that the pneumatic suspension system is readily available for the user, while the filling of reservoir 5 runs in the background without perceptibly reducing its availability for vehicle level adjustments. This is particularly advantageous when the pressure in reservoir 5 is so low that reservoir 5 cannot yet be utilized to raise the vehicle, but instead the vehicle is raised by means of compressor 13.

Figure 2:
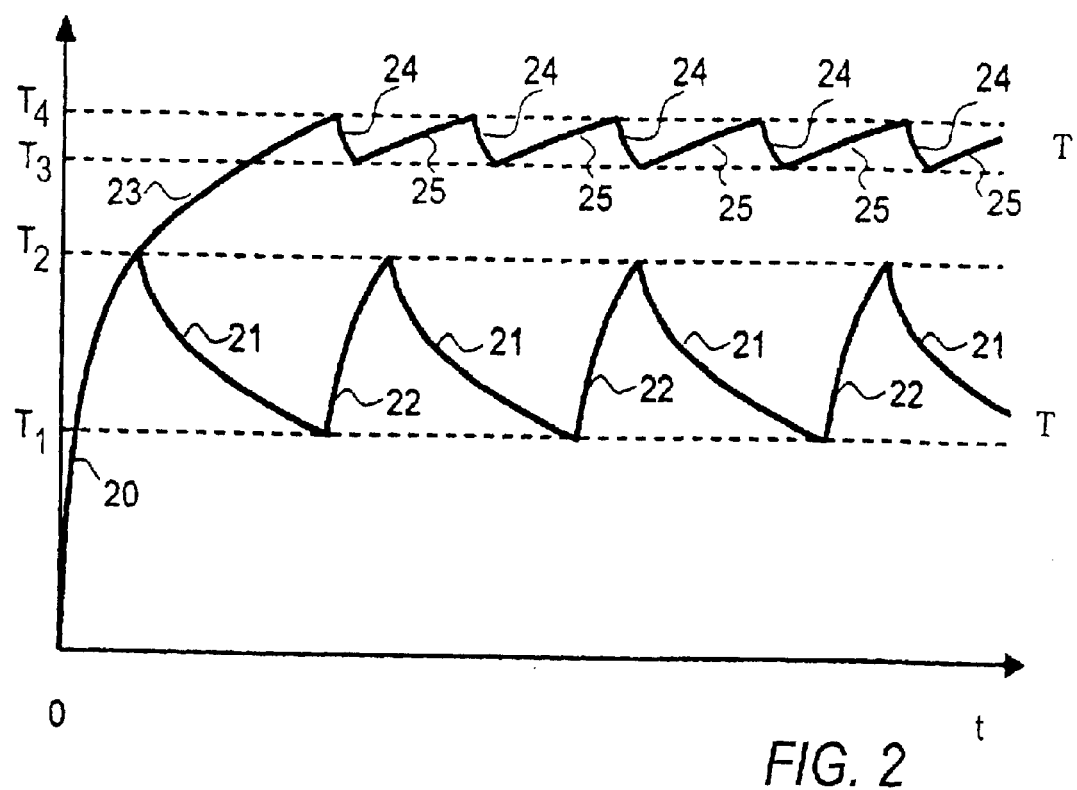
FIG. 2 is a temperature-time diagram representing an embodiment of the method and apparatus according to the present invention.

Referring now to FIG. 2, there is shown a temperature-time diagram of temperature signal T of temperature sensor 16 during a certain time interval. Starting from time 0, at which compressor 13 begins to run for the first time, temperature signal T rises according to a logarithmic function as shown by line 20.

Taking the background mode of operation as the starting point, value $T_2$ is active as the temperature limit value, and so compressor 13 is turned off when this value is reached. As a result, temperature signal T falls according to line 21. In this case, value $T_1$ is active as the restart temperature, and so compressor 13 is turned on after cooling to this lower temperature level. Thereafter, the temperature rises according to line 22. Thereupon, compressor 13 is cycled off and on, as shown from the temperature variation represented by lines 21 and 22.

During the primary mode of operation, the temperature following line 20 continues to rise according to line 23, until temperature limit value $T_4$, which is active for this mode of operation, has been reached. The compressor is then turned off, resulting in a temperature drop according to line 24. When restart temperature $T_3$, which is active in this case, has been reached, the compressor is turned on and the temperature rises according to line 25 until temperature limit value $T_4$ is reached again. Compressor 13 is then cycled off and on, as shown from the temperature variation represented by lines 24 and 25.

As shown in FIG. 2, a much larger temperature hysteresis, that is, the difference between the temperature limit value and the restart temperature allocated to the same mode of operation, is selected for the background mode of operation than for the primary mode of operation. This leads to less frequent cycling of compressor 13 between on and off, with the resulting benefit that compressor 13 suffers less wear. Another benefit is savings in current, since the high starting currents of electric motor 15 occur less often. The relatively smaller temperature hysteresis of the primary mode of operation gives that mode of operation the advantage of relatively short pause intervals for cooling of electric motor 15, and so a noticeable improvement in raising the vehicle level position is offered to a user of the pneumatic suspension system.

Figure 3:
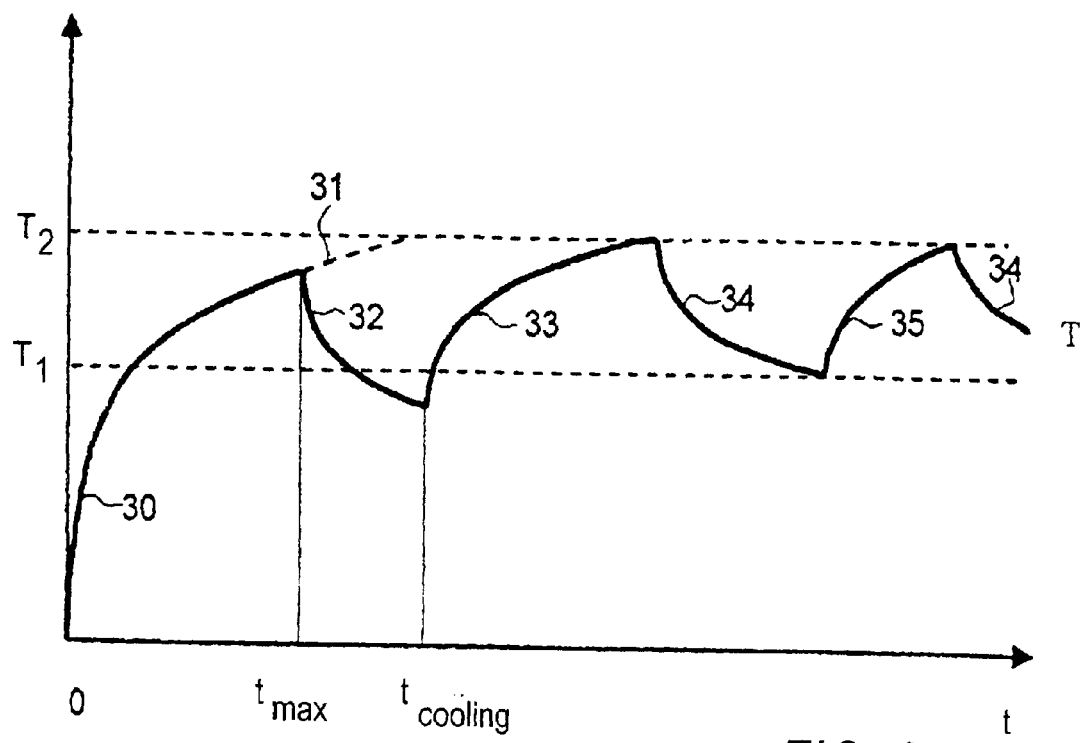
FIG. 3 is a temperature-time diagram representing another embodiment of the method and apparatus according to the present invention.

FIG. 3 illustrates an embodiment of the present invention in which time criteria are superposed on the temperature criteria for compressor 13. Beginning at time 0, temperature signal T of compressor 13 turned on for the first time rises according to line 30. The temperature turn-off criterion is reached only at temperature limit value $T_2$. The corresponding temperature variation up to temperature limit value $T_2$ is illustrated by dashed line 31. However, a time-interval limit value for turning off compressor 13 is already reached at time $t_{max}$. This early turning-off of compressor 13 has the advantage (e.g., for a cold compressor) that the pressure valve operates under gentle conditions, since it then reaches a critical temperature more rapidly than is indicated by temperature signal T, which represents, for example, the temperature at the cylinder head of compressor 13. Since the temperature measured at the cylinder head does not rise as quickly as the temperature at the pressure valve when ambient temperature is low, the pressure valve can be protected more effectively by the timed turn-off described above.

Thus, as shown in FIG. 3, the maximum running time of compressor 13 is limited by time-interval limit value $t_{max}$.

After compressor 13 has been turned off at time-interval limit value $t_{max}$, temperature T drops according to line 32. In the case of pure temperature criteria, compressor 13 would be turned on again when restart temperature $T_1$ is reached after a relatively short cooling period. As shown in FIG. 3, however, restart also can take place according to a time criterion, namely when a predefined cooling time $t_{cooling}$ has been reached. It is at that time that compressor 13 is turned on again, as can be seen in the temperature variation represented by line 33. By this delayed restart of compressor 13, cooling to a temperature level below restart temperature $T_1$ is achieved, whereby the subsequent permissible running time of compressor 13 is correspondingly prolonged.

Superposed control of compressor 13 on the basis of time criteria is preferably employed at low outside temperatures, that is, when the temperature at the cylinder head of compressor 13 rises only slowly by virtue of good heat dissipation to the surroundings while compressor 13 is turned on and drops rapidly once again while compressor 13 is turned off. In this case, compressor control on the basis of time criteria has a support function as regards reducing the starting frequency of compressor 13 without compromising its availability.

According to a further embodiment of the present invention, the ambient temperature need not be sensed separately, but can be determined indirectly by computation from the temperature variation determined at the cylinder head by means of temperature sensor 16. In this case, electronic controller 12 preferably imposes the time criteria for compressor turn off ($t_{max}$) and restart ($t_{cooling}$) predominantly on temperature limit value $T_2$ and restart temperature $T_1$. This means that compressor 13 is turned off after time-interval limit value $t_{max}$ has expired, even if temperature limit value $T_2$ has not yet been reached. Compressor 13 is turned on again only after preselected cooling time $t_{cooling}$ has expired, even if, in the interim, the temperature drops below restart temperature $T_1$.

It should be appreciated that the present invention also contemplates utilizing both the temperature sensor and thermal modeling, the signal of the temperature sensor being primarily relied on and thermal modeling being used as backup for determination of the temperature value in the event of defect or malfunction of the temperature sensor. This arrangement provides distinct benefits with regard to operating safety.

Also, it should be understood that the method and apparatus according to the present invention has application with respect to any suitable type of compressor control, such as for regulation by means of a pressure regulator or a governor, for compressors that can be decoupled via a mechanical coupling from a drive, such as an internal combustion engine, or even for compressors that can be driven via an electric motor. In connection with an electric motor as the drive of the compressor, the present invention safeguards the parts that are particularly susceptible to damage, such as brush rockers and motor windings, from damage caused by overheating. In particular, the insulation of the motor windings can be protected against melting.

It will thus be seen that the objects set forth above, among those made apparent from the preceding description, are efficiently attained, and since certain changes may be made in carrying out the above method and in the constructions set forth without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for controlling a compressor for delivering pressurized fluid to a pressurized fluid system of a vehicle, the method comprising the steps of determining the temperature at said compressor, selecting a maximum temperature for said compressor, said maximum temperature being based on backpressure caused by said pressurized fluid system, deactivating said compressor when the temperature at said compressor has exceeded said maximum temperature, and selecting a maximum time period for actuation of said compressor and deactivating said compressor after said maximum time period measured from actuation of said compressor has elapsed even if the temperature of said compressor has not exceeded said maximum temperature.

2. The method according to claim 1, further comprising the steps of selecting a minimum time period for deactivation of said compressor and maintaining said compressor deactivated until said minimum time period measured from deactivation of said compressor has expired even if said compressor has cooled to said restart temperature.

3. The method according to claim 1, wherein said step of determining the temperature at said compressor is accomplished computationally by a thermal model.

4. The method according to claim 1, wherein said pressurized fluid system is a vehicle suspension system.

5. An apparatus for controlling a compressor for delivering pressurized fluid to a pressurized fluid system of a vehicle, comprising means for determining the temperature at said compressor, means for deactivating said compressor when the temperature at said compressor has exceeded a preselected maximum temperature, said maximum temperature being based on backpressure caused by said pressurized fluid system, and means for deactivating said compressor after a preselected maximum time period measured from actuation of said compressor has elapsed even if the temperature of said compressor has not exceeded said preselected maximum temperature.

6. The apparatus according to claim 5, further comprising means for maintaining said compressor deactivated until a preselected minimum time period measured from deactivation of said compressor has expired even if said compressor has cooled to said preselected restart temperature.

7. The apparatus according to claim 5, wherein said means for determining the temperature at said compressor is a temperature sensor.

8. In a pneumatic system including a compressor, a compressed air reservoir, and at least one pneumatic device, said pneumatic system having a first mode of operation of delivering compressed air from said compressor directly to said at least one pneumatic device and a second mode of operation of delivering compressed air from said compressor to said reservoir, a method for controlling said compressor, comprising the steps of: determining the temperature at said compressor, selecting a first maximum temperature associated with said first mode of operation, selecting a second maximum temperature associated with said second mode of operation, said first and second maximum temperatures being based on backpressure caused by said pneumatic system, deactivating said compressor during said first mode of operation when the temperature at said compressor has exceeded said first maximum temperature, and deactivating said compressor during said second mode of operation when the temperature at said compressor has exceeded said second maximum temperature.

9. The method according to claim 8, further comprising the steps of selecting a first compressor restart temperature associated with said first mode of operation and actuating said compressor during said first mode of operation when said compressor has cooled to said first restart temperature.

10. The method according to claim 9, further comprising the steps of selecting a first maximum time period for actuation of said compressor in said first mode of operation and deactivating said compressor during said first mode of operation after said first maximum time period measured from actuation of said compressor has elapsed even if the temperature of said compressor has not exceeded said first maximum temperature.

11. The method according to claim 10, further comprising the steps of selecting a first minimum time period for deactivation of said compressor in said first mode of operation and maintaining said compressor deactivated during said first mode of operation until said first minimum time period measured from deactivation of said compressor has expired even if said compressor has cooled to said first restart temperature.

12. The method according to claim 8, further comprising the steps of selecting a second compressor restart temperature associated with said second mode of operation and actuating said compressor during said second mode of operation when said compressor has cooled to said second restart temperature.

13. The method according to claim 12, further comprising the steps of selecting a second maximum time period for actuation of said compressor in said second mode of operation and deactivating said compressor during said second mode of operation after said second maximum time period measured from actuation of said compressor has elapsed even if the temperature of said compressor has not exceeded said second maximum temperature.

14. The method according to claim 13, further comprising the steps of selecting a second minimum time period for deactivation of said compressor in said second mode of operation and maintaining said compressor deactivated during said second mode of operation until said second minimum time period measured from deactivation of said compressor has expired even if said compressor has cooled to said second restart temperature.

15. The method according to claim 8, wherein the second maximum temperature is lower than a maximum temperature theoretically permissible based on said backpressure.

16. The method according to claim 15, wherein said theoretically permissible maximum temperature is a temperature beyond which said compressor would sustain damage due to overheating.

17. The method according to claim 8, wherein said pneumatic system is a vehicle suspension system and said at least one pneumatic device is at least one vehicle suspension device.

18. The method according to claim 8, wherein said step of determining the temperature at said compressor is accomplished computationally by a thermal model.

19. The method according to claim 8, further comprising the step of determining the temperature at said compressor by a thermal model in the event that said temperature sensor malfunctions.

20. The method according to claim 8, further comprising the steps of selecting a first compressor restart temperature at which said compressor is actuated during said first mode of operation when said compressor has cooled to said first restart temperature and a second compressor restart temperature at which said compressor is actuated during said second mode of operation when said compressor has cooled to said second restart temperature such that the difference between said first maximum temperature and said first restart temperature is less than the difference between said second maximum temperature and said second restart temperature.

21. In a pneumatic system including a compressor, a compressed air reservoir, and at least one pneumatic device, said pneumatic system having a first mode of operation of delivering compressed air from said compressor directly to said at least one pneumatic device and a second mode of operation of delivering compressed air from said compressor to said reservoir, an apparatus for controlling said compressor, comprising: means for determining the temperature at said compressor, means for deactivating said compressor during said first mode of operation when the temperature at said compressor has exceeded a first maximum temperature associated with said first mode of operation, and means for deactivating said compressor during said second mode of operation when the temperature at said compressor has exceeded a second maximum temperature associated with said second mode of operation, said first and second maximum temperatures being based on backpressure caused by said pneumatic system.

22. The apparatus according to claim 21, further comprising means for actuating said compressor during said first mode of operation when said compressor has cooled to a first restart temperature associated with said first mode of operation.

23. The apparatus according to claim 22, further comprising means for deactivating said compressor during said first mode of operation after a first maximum time period for actuation of said compressor in said first mode of operation measured from actuation of said compressor has elapsed even if the temperature of said compressor has not exceeded said first maximum temperature.

24. The apparatus according to claim 23, further comprising means for maintaining said compressor deactivated during said first mode of operation until a first minimum time period for deactivation of said compressor in said first mode of operation measured from deactivation of said compressor has expired even if said compressor has cooled to said first restart temperature.

25. The apparatus according to claim 21, further comprising means for actuating said compressor during said second mode of operation when said compressor has cooled to a second restart temperature associated with said second mode of operation.

26. The apparatus according to claim 25, further comprising means for deactivating said compressor during said second mode of operation after a second maximum time period for actuation of said compressor in said second mode of operation measured from actuation of said compressor has elapsed even if the temperature of said compressor has not exceeded said second maximum temperature.

27. The apparatus according to claim 26, further comprising means for maintaining said compressor deactivated during said second mode of operation until a second minimum time period for deactivation of said compressor in said second mode of operation measured from deactivation of said compressor has expired even if said compressor has cooled to said second restart temperature.

28. The apparatus according to claim 21, wherein said means for determining the temperature at said compressor is a temperature sensor.

29. In a pneumatic system including a compressor, said pneumatic system having a plurality of modes of operation for delivering compressed air, a method for controlling said compressor, said method comprising the steps of determining the temperature at said compressor, allocating a separate maximum temperature to each mode of operation of said plurality of modes of operation, said maximum temperature being based on backpressure caused by said pneumatic system, and deactivating said compressor during one of said modes of operation when the temperature at said compressor has exceeded said maximum temperature allocated to said one of said modes of operation.

30. The method according to claim 29, further comprising the steps of allocating a separate compressor restart temperature to each mode of operation of said plurality of modes of operation, and actuating said compressor deactivated during said one of said modes of operation when said compressor has cooled to said restart temperature allocated to said one of said modes of operation.

31. The method according to claim 30, further comprising the steps of allocating a separate maximum time period for actuation of said compressor to each mode of operation of said plurality of modes of operation, and deactivating said compressor during one of said modes of operation after said maximum time period allocated to said one of said modes of operation measured from actuation of said compressor has elapsed even if the temperature of said compressor has not exceeded said maximum temperature allocated to said one of said modes of operation.

32. The method according to claim 31, further comprising the steps of allocating a separate minimum time period for deactivation of said compressor to each mode of operation of said plurality of modes of operation, and maintaining said compressor deactivated during said one of said modes of operation until said minimum time period allocated to said one of said modes of operation measured from deactivation of said compressor has expired even if said compressor has cooled to said restart temperature allocated to said one of said modes of operation.

33. In a pneumatic system including a compressor, said pneumatic system having a plurality of modes of operation for delivering compressed air, an apparatus for controlling said compressor, said apparatus comprising means for determining the temperature at said compressor, means for allocating a separate maximum temperature to each mode of operation of said plurality of modes of operation, said maximum temperature being based on backpressure caused by said pneumatic system, and means for deactivating said compressor during one of said modes of operation when the temperature at said compressor has exceeded said maximum temperature allocated to said one of said modes of operation.

34. The apparatus according to claim 33, further comprising means for allocating a separate compressor restart temperature to each mode of operation of said plurality of modes of operation, and means for actuating said compressor deactivated during said one of said modes of operation when said compressor has cooled to said restart temperature allocated to said one of said modes of operation.

35. The apparatus according to claim 34, further comprising means for allocating a separate maximum time period for actuation of said compressor to each mode of operation of said plurality of modes of operation, and means for deactivating said compressor during one of said modes of operation after said maximum time period allocated to said one of said modes of operation measured from actuation of said compressor has elapsed even if the temperature of said compressor has not exceeded said maximum temperature allocated to said one of said modes of operation.

36. The apparatus according to claim 35, further comprising means for allocating a separate minimum time period for deactivation of said compressor to each mode of operation of said plurality of modes of operation, and means for maintaining said compressor deactivated during said one of said modes of operation until said minimum time period allocated to said one of said modes of operation measured from deactivation of said compressor has expired even if said compressor has cooled to said restart temperature allocated to said one of said modes of operation.

* * * * *